United States Patent [19]

Webb

[11] Patent Number: 4,635,789

[45] Date of Patent: Jan. 13, 1987

[54] LOCKING MECHANISM FOR MAGNETIC TAPE

[76] Inventor: Bryan Webb, 5531 S. Newport Ave., Tulsa, Okla. 74105

[21] Appl. No.: 737,727

[22] Filed: May 28, 1985

[51] Int. Cl.$^4$ ............................................. B65D 85/67
[52] U.S. Cl. ..................... 206/53; 206/411; 242/55.53
[58] Field of Search ................... 206/53–55, 206/411, 398, 400, 387; 242/197, 199, 55.53

[56] References Cited

U.S. PATENT DOCUMENTS

| | | | |
|---|---|---|---|
| 2,768,740 | 10/1956 | Cranwill | 206/53 |
| 3,107,010 | 10/1963 | Kulka | 206/53 |
| 3,124,243 | 3/1969 | Kulka | 206/53 |
| 3,156,353 | 11/1964 | Harnish | 206/400 |
| 3,195,722 | 7/1965 | Duden | 206/53 |
| 3,251,462 | 5/1966 | Hultgren | 206/400 |
| 3,357,547 | 12/1967 | Thoms | 206/53 |
| 3,599,786 | 8/1971 | Osojnak | 206/387 |
| 3,630,345 | 12/1971 | Schmidt | 206/53 |
| 3,650,388 | 3/1972 | Osojnak | 206/398 |

Primary Examiner—William Price
Assistant Examiner—Bryon Gehman
Attorney, Agent, or Firm—William S. Dorman

[57] ABSTRACT

A locking mechanism for magnetic computer tape to be used in conjunction with a closure strap or canister, the magnetic tape being wound about a central hub of a reel, the reel comprising a pair of spaced circular flanges connected at their centers to the hub; the locking mechanism comprising a flexible plastic strip having double sided adhesive pads attached to its ends, the loop being bent and joined at its adhesive ends to form a small loop; the loop being firmly attached to an interior portion of the strap or canister whereby the loop fits between the flanges and bears against the outer winding of the tape to prevent the tape from becoming unwound.

4 Claims, 5 Drawing Figures

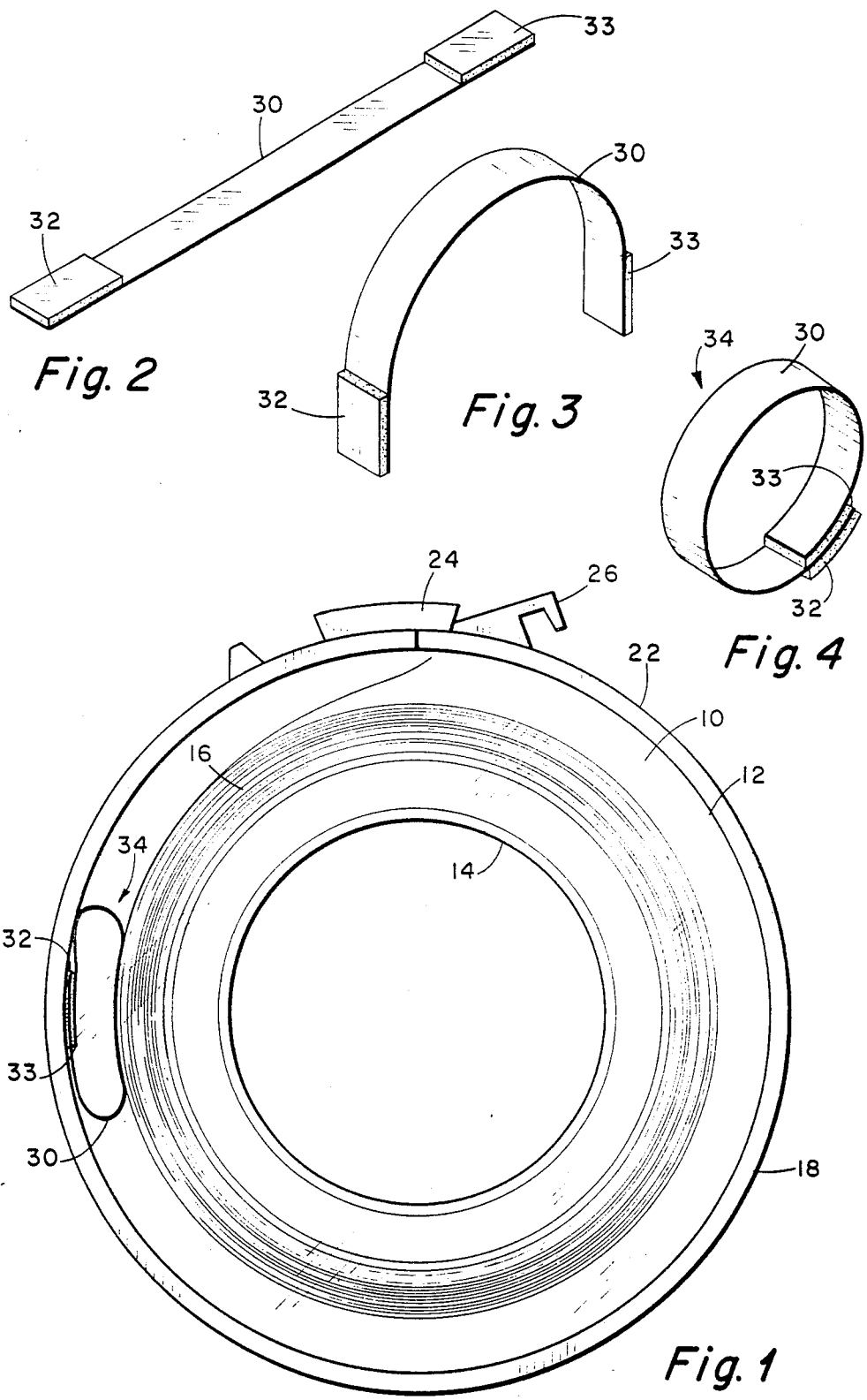

LOCKING MECHANISM FOR MAGNETIC TAPE

BACKGROUND OF THE INVENTION

1. Field of the Invention

The present invention relates to a locking or retaining means for maintaining a tape in a wound position about the hub of a reel. More particularly, the present invention relates to a locking mechanism used in conjunction with a closure device for a magnetic computer tape reel.

2. Prior Art

It is common to provide magnetic computer tape reels with protective straps or canisters. These above closure devices protect the magnetic tape from dust contamination or the like but they do not prevent layer separation or the tape becoming unwound during storage.

It is desirable in the computer industry to prevent unwinding of the magnetic tape and the attendant damage problems. Any damage such as a fold, can cause a loss of data. It is also desirable to prevent manual handling of the tape due to the possibility of residue contamination from the fingertips. For example, a finger print can cause a separation of the tape and the read and write head of the computer tape handling unit. The above separation results in a signal loss of data. Heretofore other means of retaining the tape in a wound position have been cumbersome and costly. The common practice is to insert a small rectangular piece of foam rubber compressed between the flanges of the reel. Generally this foam rubber piece is discarded after initial use.

A patent search was conducted and the following prior art references were uncovered U.S. Pat. Nos.:

| | | |
|---|---|---|
| 3,124,243 | 3,437,196 | 2,971,642 |
| 2,768,740 | 3,357,547 | 3,089,585 |
| 3,141,550 | 3,600,762 | 3,161,290 |

A closure and retaining means is disclosed in U.S. Pat. No. 3,124,243 to Kulka. The retaining means comprises a wedge made of yieldable material built into a closure step. Although yieldable, the wedge lacks flexibility for use with various amounts of tape wound about the reel. In addition, its use is limited to a specific closure strap.

Another prior art patent, U.S. Pat. No. 2,768,740 to Cranwill, discloses a rectangular lock plate which is attached to a rubber band like device that rests on the tape. The lock plate is provided with an inwardly projecting metal leaf spring having a rubber coated end. The metal spring would damage the magnetic computer tape and would therefore be inappropriate.

No prior art reference discloses a locking mechanism with a high degree of flexibility that is safe to use with magnetic computer tape. No prior art reference discloses a mechanism that can be readily mounted on the various conventional closure devices used in the computer industry.

SUMMARY OF THE INVENTION

The present invention provides an efficient and economical means for retaining magnetic computer tape in a wound position. The present invention can be readily mounted on any closure strap or canister which are commonly used to protect computer tape. The present invention provides a highly flexible locking means which can be used with various tape amounts.

The present invention comprises a thin plastic polyester strip generally ⅜" wide. The width of the strip can vary depending on the type of closure device on which it is to be mounted. Generally this locking strip is 4½" long and it is curved or bent to form a locking loop approximately 1⅜" in diameter. The length and its resultant loop diameter is also variable depending on need.

The ends of the strip are provided with non-metallic pads of double-faced adhesive. The ends are fastened together by means of the adhesive pads to form a loop and the outer portion of the pad is used to mount the loop on the interior surface of a canister or closure strap. The closure strap comprises an arcuate plastic loop which fits between the flanges of a reel and is provided with a latch that locks the strap in position.

The locking loop slides between the reel flanges to press against the leading end of the magnetic tape. The loop bears against the tap as it flexes to the contour of the tape thus firmly retaining the tape in a wound position. The ability to slide the loop between the flanges eliminates the need to manually guide the tape.

BRIEF DESCRIPTION OF THE DRAWINGS

FIG. 1 is a elevational view of a magnetic tape reel and a closure strap having the locking loop of the present invention mounted thereon;

FIG. 2 is an isometric view of the locking loop of the present invention before being formed into a loop;

FIG. 3 is a isometric view of the locking loop of the present invention as it is being curved;

FIG. 4 is a isometric view of the locking loop of the present invention ready for use;

DETAILED DESCRIPTION OF THE PREFERRED EMBODIMENTS

Figure 5:
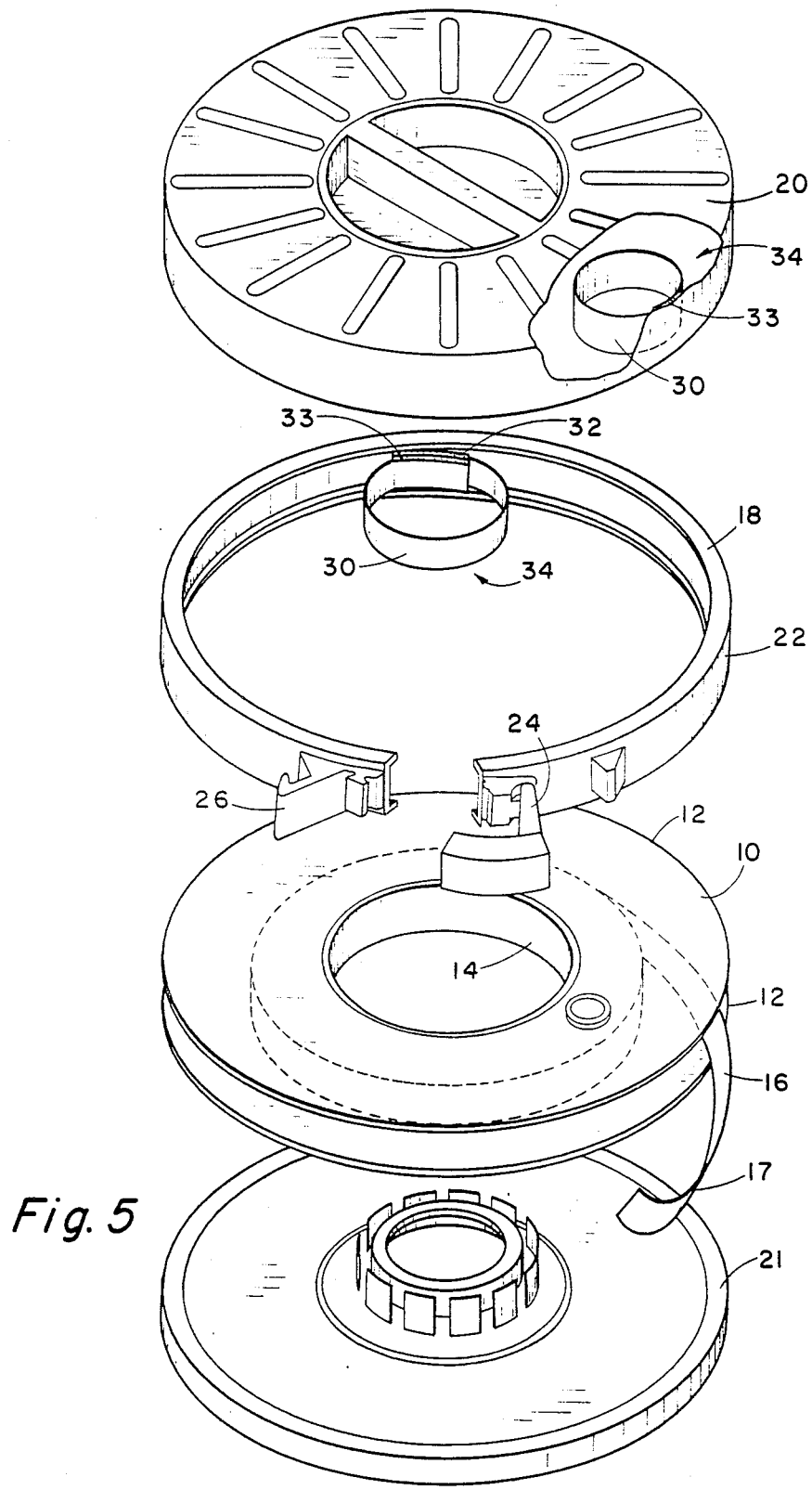
FIG. 5 is an exploded isometric view of various applications of the present invention.

Referring to FIGS. 1 and 5, a conventional reel 10 is shown which comprises a pair of circular disks or flanges 12 connected at their centers to a hub 14. A conventional magnetic computer tape 16 is shown wound about hub 14 and extends outwardly therefrom adjacent the periphery of flanges 12. Reel 10 is provided with a protective closure strap 18 or canister lid 20 which prevents dust contamination of tape 16. Generally strap 18 is the most common closure device used and comprises a flexible arcuate band 22 of plastic which tightly engages the outer edges of flanges 12 and is secured by means of a latch 24 which clamps onto a portion of a hanger 26. The canister lid 20 is used in conjunction with a bottom or base 21 upon which the reel 10 rests and against which the lid can be locked in a conventional manner.

Referring to FIGS. 2, 3 and 4, the present invention comprises a flexible plastic polyester strip 30 having adhesive tabs 32 and 33 on its opposite ends on the upper surface of the strip. Tabs 32 and 33 are non-metallic pads of double coated adhesive and provide a means for forming the locking or retaining loop 34 of the present invention. The tabs also provide a means for mounting loop 34 on strap 18 or canister lid 20.

Referring to FIGS. 3 and 4, the adhesive cover (not shown) is removed from one tab 33 and strip 30 is bent to form loop 34. The tab 33 is now adhesively attached to the other end of strip 30 on the side opposite from the tab 32. Strip 30 is generally ⅜" in width and 4½" in length thereby forming a loop 34 having an approximate diameter of 1½ inches. However, all the above dimensions are variable depending upon the type of closure (18 or 20) device used or the amount of tape 16 wound on a reel 10.

Returning to FIGS. 1 and 5, the adhesive cover of the outermost tab 32 is removed and loop 34 is mounted on an interior portion of strap 18 and is firmly pressed thereto thereby assuring proper adhesion. Loop 34 can be mounted anywhere along the interior surface of the strap providing it is not directly adjacent latch 24. Loop 34 can also be mounted in the lid of case 20 as shown in the upper portion of FIG. 5. As shown, the loop is mounted onto the interior of the rim approximately ¼" from canister top.

The retaining loop 34 of the present invention provides a means for engaging the lead end 17 of tape 16. When the strap or canister is attached to reel 10, the loop fits between flanges 12 and bears against the outer portion or winding of tape 16. The now inwardly projecting loop 34 flexes to the contour of the tape thereby retaining the tape in a tightly wound position as shown in FIG. 1.

Whereas the present invention has been described in particular relation to the drawings attached hereto, it should be understood that other and further modifications, apart from those shown or suggested herein, may be made within the spirit and scope of this invention.

What is claimed is:

1. A locking mechanism for magnetic tape to be used in conjunction with a closure means for protecting said magnetic tape, said magnetic tape being wound about a central hub of a reel, said reel comprising a pair of spaced circular flanges connected at their centers to said hub; said locking mechanism comprising a flexible plastic strip having a pair of spaced adhesive means attached to the opposite ends of the strip, said strip being bent and joined at its ends by one of said adhesive means to form a small loop, said loop being attached by the other of said adhesive ends to an interior portion of said closure means and whereby attaching said closure means to said reel permits said loop to fit between said flanges and bear against the outer portion of said tape thereby preventing said tape from becoming unwound from said hub.

2. A locking mechanism as set forth in claim 1 wherein said adhesive means comprises double-sided non-metallic adhesive pads affixed to the ends of said strip.

3. A locking mechanism as set forth in claim 1 and being further characterized by said strip being ⅜ inches in width and 4½ inches in length thereby forming a loop having a diameter of 1½ inches.

4. A locking mechanism as set forth in claim 1 wherein said closure means comprises an arcuate flexible plastic strip which tightly engages the edges of said flanges and clamps thereto.

* * * * *